(12) United States Patent
Lin et al.

(10) Patent No.: US 12,420,610 B2
(45) Date of Patent: Sep. 23, 2025

(54) THERMAL MANAGEMENT INTEGRATION MODULE AND ELECTRIC VEHICLE

(71) Applicants: Zhejiang Geely Holding Group Co., Ltd, Zhejiang (CN); Ningbo Geely Automobile Research & Development Co. Ltd., Zhejiang (CN)

(72) Inventors: Bingrong Lin, Zhejiang (CN); Junbo Xu, Hangzhou Zhejiang (CN); Guibin Li, Zhejiang (CN); Qiang Xue, Zhejiang (CN); Haijiang Dai, Zhejiang (CN)

(73) Assignees: ZHEJIANG GEELY HOLDING GROUP CO., LTD, Zhejiang (CN); NINGBO GEELY AUTOMOBILE RESEARCH & DEVELOPMENT CO. LTD., Zhejiang (CN)

( * ) Notice: Subject to any disclaimer, the term of this patent is extended or adjusted under 35 U.S.C. 154(b) by 201 days.

(21) Appl. No.: 18/463,324

(22) Filed: Sep. 8, 2023

(65) Prior Publication Data
US 2023/0415541 A1 Dec. 28, 2023

Related U.S. Application Data

(63) Continuation of application No. PCT/CN2022/086118, filed on Apr. 11, 2022.

(30) Foreign Application Priority Data

Jun. 24, 2021 (CN) .......................... 202110703529.X

(51) Int. Cl.
B60H 1/00 (2006.01)
B60H 1/32 (2006.01)

(52) U.S. Cl.
CPC ..... *B60H 1/00392* (2013.01); *B60H 1/00278* (2013.01); *B60H 1/00485* (2013.01); *B60H 1/3229* (2013.01)

(58) Field of Classification Search
CPC ............ B60H 1/00392; B60H 1/00278; B60H 1/00485; B60H 1/3229
(Continued)

(56) References Cited

U.S. PATENT DOCUMENTS

2009/0183936 A1 7/2009 Kim et al.
2020/0353811 A1 11/2020 Wolf et al.
2023/0226877 A1 7/2023 Hu et al.

FOREIGN PATENT DOCUMENTS

CN 106143092 A 11/2016
CN 107097664 A 8/2017
(Continued)

OTHER PUBLICATIONS

First Office Action dated Aug. 20, 2024 received in corresponding patent family application No. JP2023-576243. English translation attached.

(Continued)

*Primary Examiner* — Davis D Hwu

(57) ABSTRACT

Provided is a thermal management integration module (100) and an electric vehicle. The thermal management integration module (100) includes: a multi-channel integration board (110) having a plurality of cooling connection pipelines (111) formed therein, the multi-channel integration board (110) being configured as a carrier member for the thermal management integration module (100); and at least two thermal management components mounted on the multi-channel integration board (110) and connected to each other by the plurality of cooling connection pipelines (111). The design of the multi-channel integration board can not only serve as a connection channel between different thermal (Continued)

management components, but also serve as a carrier member for the entire integration module to enable the thermal management components to be integrated on the multi-channel integration board, forming the thermal management integration module with low costs, a light weight, and a small arrangement space.

20 Claims, 9 Drawing Sheets

(58) Field of Classification Search
USPC .......................................................... 165/202
See application file for complete search history.

(56) References Cited

FOREIGN PATENT DOCUMENTS

| CN | 108068572 | A | | 5/2018 | |
|---|---|---|---|---|---|
| CN | 110816207 | A | | 2/2020 | |
| CN | 110906589 | A | * | 3/2020 | ............... F24H 4/04 |
| CN | 106532173 | B | * | 6/2020 | ......... F28D 1/05333 |
| CN | 111231613 | A | | 6/2020 | |
| CN | 112319210 | A | | 2/2021 | |
| CN | 112543709 | A | | 3/2021 | |
| CN | 212765592 | U | | 3/2021 | |
| CN | 112606676 | A | | 4/2021 | |
| CN | 113276630 | A | | 8/2021 | |
| CN | 113650528 | A | | 11/2021 | |
| CN | 216268565 | U | | 4/2022 | |
| DE | 102020116726 | A1 | | 7/2021 | |
| DE | 202021104430 | U1 | | 8/2021 | |
| JP | 2019023442 | A | | 2/2019 | |
| KR | 102189058 | B1 | | 12/2020 | |
| WO | 2020065219 | A1 | | 4/2020 | |
| WO | 2021048095 | A1 | | 3/2021 | |

OTHER PUBLICATIONS

Extended European Search Report from corresponding European Application No. EP22827134.2, dated Sep. 26, 2024.
International Search Report dated Jul. 19, 2022 in International Application No. PCT/CN2022/086118. English translation attached.
First Office Action from corresponding Chinese Application No. 202110703529.X, dated Mar. 9, 2022. English translation attached.
The Grant Notice from corresponding Chinese Application No. 202110703529.X, dated Jul. 22, 2022. English translation attached.
Notice of Reasons for Refusal dated Aug. 19, 2025 received in corresponding patent family application No. JP2023576243. English translation attached.
First Office Action dated May 30, 2025 received in corresponding patent family application No. KR1020237035572. English translation attached.

* cited by examiner

Mounting points for the temperature sensor

THERMAL MANAGEMENT INTEGRATION MODULE AND ELECTRIC VEHICLE

CROSS-REFERENCE TO RELATED APPLICATIONS

This application is a continuation of International Application No. PCT/CN2022/086118 filed on Apr. 11, 2022, which claims a priority of Chinese Application No. 202110703529.X filed on Jun. 24, 2021, the entire disclosure of which is incorporated herein by reference.

FIELD

The present disclosure relates to the field of vehicle technologies, and more particularly, to a thermal management integration module and an electric vehicle.

BACKGROUND

Based on a vehicle thermal management principle diagram, an electric vehicle often requires a number of thermal management components, such as an expansion tank, at least two cooling water pumps, a heat exchanger, a water-cooled condenser, at least two water temperature sensors, a four-port solenoid valve, a three-port solenoid valve, and a cooling connection pipeline. To increase a range of a pure electric vehicle, the design of the vehicle thermal management diagram needs to be adapted to more and more working conditions, and thus more and more thermal management components are required. In the related art, these thermal management components are dispersed. On the one hand, the dispersed thermal management components will occupy a large arrangement space. On the other hand, such a dispersed arrangement leads to a need to use a large number of cooling pipelines for connections among the thermal management components, but the large number of cooling pipelines bring about a complex cabin, a difficult arrangement, and higher costs. In addition, the dispersed arrangement also leads to an increase in lengths of the cooling connection pipelines and an air conditioning pipeline, which in turn leads to an increase in a system flow resistance and a heat leakage value, requiring a water pump having higher power and longer Positive Temperature Coefficient (PTC) heating time or increased PTC heating power to meet system requirements. This also leads to an increase of system costs. Therefore, it is an urgent to-be-solved technical problem in the related art regarding how to develop a new type of thermal management integration module that is cost-effective, lightweight, and with a reduced arrangement space.

SUMMARY

In view of the above problems, a thermal management integration module and an electric vehicle that overcome the above problems or at least partially solve the above problems are provided.

An object of the present disclosure is to provide a thermal management integration module with low costs, a light weight, and a small arrangement space.

A further object of the present disclosure is to realize a more compact arrangement of thermal management components through a reasonable layout of the thermal management components on a multi-channel integration board, and to optimize a layout of cooling connection pipelines in the multi-channel integration board, reducing manufacturing difficulty.

A further object of the present disclosure is to make a connection pipeline of a thermal management object with both a cooling pipeline external port and an air conditioning pipeline external port of the thermal management integration module the shortest, to further reduce costs and a weight of the whole vehicle.

In particular, in an aspect, according to the embodiments of the present disclosure, a thermal management integration module is provided. The thermal management integration module includes: a multi-channel integration board having a plurality of cooling connection pipelines formed therein, the multi-channel integration board being configured as a carrier member for the thermal management integration module; and at least two thermal management components mounted on the multi-channel integration board and connected to each other by the plurality of cooling connection pipelines.

In some embodiments, the at least two thermal management components include at least two of an expansion tank, a multi-port valve, a water pump, a heat exchanger, a condenser, a temperature sensor, a dryer, an electronic expansion valve, a two-port proportional valve, or an air conditioning pipeline.

In some embodiments, when the at least two thermal management components include the water pump, at least two water pumps are provided, and the at least two water pumps are mounted on a same side of an end of the multi-channel integration board in a length direction and are arranged in a width direction of the multi-channel integration board; and when the at least two thermal management components further include the expansion tank, the expansion tank is mounted at a position on a side of the multi-channel integration board opposite to the water pump.

In some embodiments, when the at least two thermal management components include the multi-port valve, the multi-port valve is mounted on a middle portion of a side of the multi-channel integration board, and the multi-port valve is a nine-port valve.

In some embodiments, when the at least two thermal management components further include the heat exchanger, the heat exchanger is mounted on the same side of the multi-channel integration board as the multi-port valve and close to a position of the multi-port valve; and when the at least two thermal management components further include the condenser, the condenser is mounted at an end of the multi-channel integration board in a length direction, located on the same side of the multi-channel integration board as the heat exchanger, and adjacent to the heat exchanger.

In some embodiments, when the at least two thermal management components further include the dryer, the electronic expansion valve, and the air conditioning pipeline, the dryer and the electronic expansion valve are respectively mounted at positions on the side of the multi-channel integration board opposite to the heat exchanger, and the air conditioning pipeline is connected to the dryer, the electronic expansion valve, the heat exchanger, and the condenser; or when the at least two thermal management components further include the electronic expansion valve and the air conditioning pipeline, the electronic expansion valve is mounted on the same side of the multi-channel integration board as the heat exchanger and close to a position of the heat exchanger, and the air conditioning pipeline is connected to the electronic expansion valve, the heat exchanger, and the condenser.

In some embodiments, the air conditioning pipeline has a built-in condenser inlet port, a built-in condenser outlet port, a compressor inlet port, and a compressor outlet port; each of the built-in condenser inlet port and the built-in condenser outlet port is configured to be connected to a refrigerant connection pipeline of a built-in condenser of an air conditioning main unit of a vehicle, and each of the compressor inlet port and the compressor outlet port is configured to be connected to a refrigerant connection pipeline of a compressor of the vehicle; and positions of the built-in condenser inlet port, the built-in condenser outlet port, the compressor inlet port, and the compressor outlet port are distributed based on arrangement positions of the built-in condenser and the compressor to enable the refrigerant connection pipeline of the built-in condenser and the refrigerant connection pipeline of the compressor to be the shortest.

In some embodiments, the multi-channel integration board further has a plurality of cooling pipeline external ports formed thereon, each of the plurality of cooling pipeline external ports is configured to be connected to a cooling liquid connection pipeline of a thermal management object of a vehicle, and positions of the plurality of external cooling pipeline external ports are arranged based on an arrangement position of the thermal management object to enable the cooling liquid connection pipeline of the thermal management object to be the shortest.

In some embodiments, the cooling pipeline external port includes a radiator liquid-inlet port, a radiator liquid-outlet port, a Direct Current-Direct Current (DC-DC) converter liquid-inlet port, a high pressure liquid heater liquid-inlet port, a high pressure liquid heater liquid-outlet port, an on-vehicle charger liquid-outlet port, a battery pack liquid-inlet port, and a battery pack liquid-outlet port; the radiator liquid-inlet port, the radiator liquid-outlet port, and the DC-DC converter liquid-inlet port are located at an end of the multi-channel integration board in a length direction, and the radiator liquid-inlet port and the radiator liquid-outlet port protrude towards a side of the multi-channel integration board; and the high pressure liquid heater liquid-inlet port, the on-vehicle charger liquid-outlet port, the battery pack liquid-outlet port, the high pressure liquid heater liquid-outlet port, and the battery pack liquid-inlet port are located at the other end of the multi-channel integration board in the length direction, are arranged in a width direction of the multi-channel integration board sequentially, and each have a protrusion direction identical to a protrusion direction of the radiator liquid-inlet port.

According to one embodiment of the present disclosure, an electric vehicle is further provided. The electric vehicle includes the thermal management integration module according to any of the above embodiments.

The thermal management integration module of the present disclosure adopts the design of the multi-channel integration board. The plurality of cooling connection pipelines is formed in the multi-channel integration board. The multi-channel integration board can not only serve as a connection channel between different thermal management components, but also serve as a carrier member for the entire integration module to enable the thermal management components to be integrated on the multi-channel integration board, forming the thermal management integration module with low costs, a light weight, and a small arrangement space. Compared with a conventional vehicle thermal management system, the thermal management integration module of the present disclosure can allow costs of each vehicle to be reduced by more than 300 RMB and a weight of each vehicle to be reduced by more than 2 kg. In addition, the thermal management integration module of the present disclosure can be supplied in a modular form, which greatly optimizes supplier management and working hours of manufacturing workers.

Further, for specific integrated thermal management components (which in some embodiments may include the expansion tank, the multi-port valve, the water pump, the heat exchanger, the condenser, the temperature sensor, the dryer, the electronic expansion valve, the air conditioning pipeline, or the like), a more compact arrangement of the thermal management components is realized through a reasonable layout of the thermal management components on the multi-channel integration board, and the layout of cooling connection pipelines in the multi-channel integration board is optimized, reducing the manufacturing difficulty.

Further, the thermal management integration module may further provide a plurality of cooling pipeline external ports and air conditioning pipeline external ports that are configured to be connected to a connection pipeline of the thermal management object. In addition, positions of the cooling pipeline external ports and the air conditioning pipeline external ports are arranged based on the arrangement position of the thermal management object to enable the connection pipeline of the thermal management object to be the shortest, further reducing the costs and weight of the whole vehicle.

Further, since the thermal management integration module of the present disclosure can save a large number of cooling connection pipelines and air conditioning pipelines, a flow resistance and a heat leakage value of the system are reduced, which can lower a power requirement of the water pump, and reduce PTC heating time or PTC heating power, further decreasing the costs and power consumption of the whole vehicle and increasing a range. It was estimated that a power requirement of the water pump can be reduced by about 20%, and PTC heating power consumption can be reduced by about 200 W, and the range can be increased by about 10 km.

The above description is merely an overview of the technical solutions of the present disclosure. To facilitate a clear understanding of technical means of the present disclosure and the implementations of the technical solutions in accordance with the contents of the specification, and to clarify and explain the above and other objects, features, and advantages of the present disclosure, specific embodiments of the present disclosure will be described below.

The above and other objects, advantages, and features of the present disclosure will be clearly understood by those skilled in the art in the light of the following detailed description of specific embodiments of the present disclosure made in conjunction with the accompanying drawings.

BRIEF DESCRIPTION OF THE DRAWINGS

Some specific embodiments of the present disclosure will be described in detail below in an exemplary and non-restrictive manner with reference to the accompanying drawings. Same or similar components or portions are denoted by same reference numerals in the accompanying drawings. It should be understood by those skilled in the art that these accompanying drawings are not necessarily drawn to scale.

DETAILED DESCRIPTION

Figure 1:
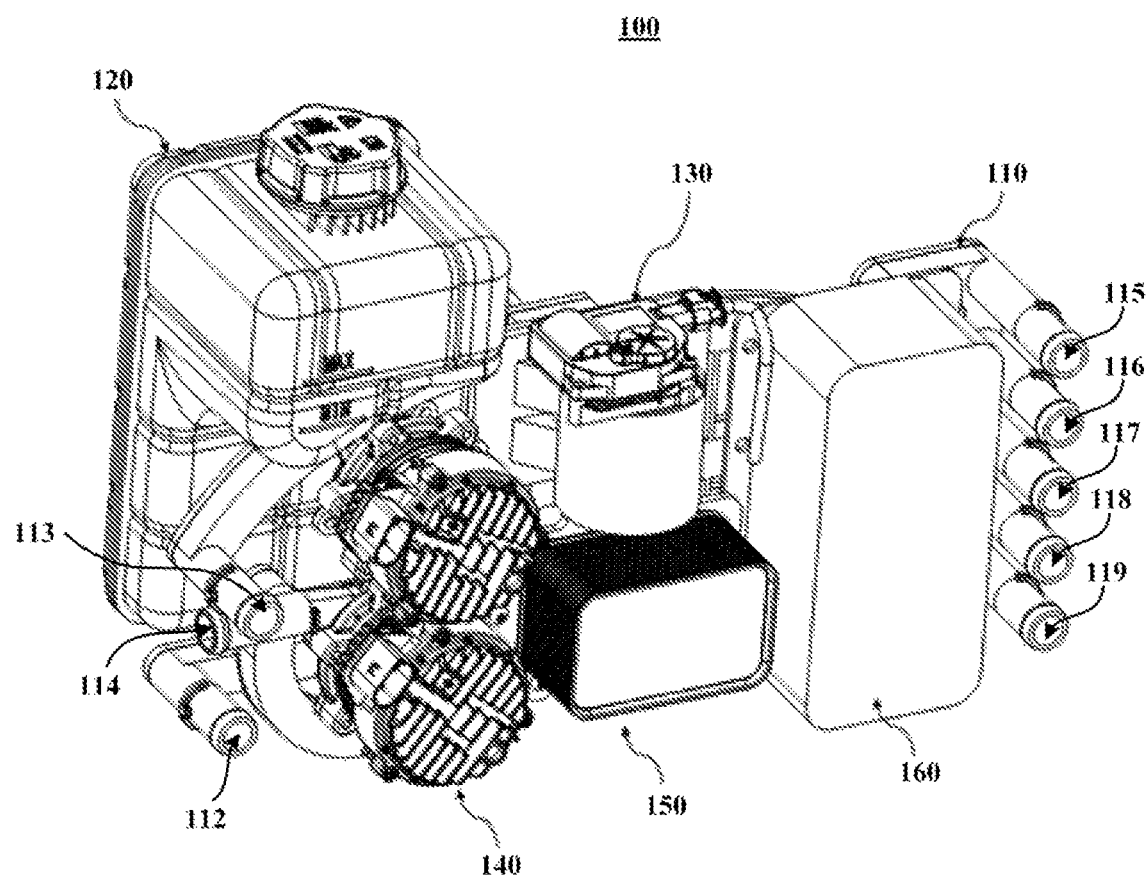
FIG. 1 illustrates a schematic structural view of a thermal management integration module according to an embodiment of the present disclosure, as viewed from a side thereof.

Some exemplary embodiments of the present disclosure will be described in detail below with reference to the accompanying drawings. Although some exemplary embodiments of the present disclosure are illustrated in the drawings, it should be understood that the present disclosure may be embodied in various forms and should not be construed as being limited to the embodiments set forth herein. Instead, these embodiments are provided for a thorough understanding of the present disclosure, and these embodiments can fully convey the scope of the present disclosure to those skilled in the art.

Since thermal management components in a conventional vehicle thermal management system are arranged in a dispersed manner, the conventional vehicle thermal management system has the following problems: (1) Lengths of a cooling pipeline and an air conditioning pipeline increase, which leads to a rise in a flow resistance of the system, requiring the use of a high-power water pump to meet a system requirement. (2) Increase in the lengths of the cooling pipeline and the air conditioning pipeline further leads to an increase in a heat leakage value of the system, raising a need to lengthen PTC heating time or increase PTC heating power to meet a heating requirement of the system. (3) Thermal management components such as an expansion tank, a motor water pump assembly, a battery water pump assembly, a heat exchanger, a water-cooled condenser, a water temperature sensor, two four-port solenoid valves, a three-port solenoid valve, a two-port proportional valve, an air conditioning electronic expansion valve, and an air conditioning pipeline are arranged in a dispersed manner, and connected by the cooling pipeline and the air conditioning pipeline, resulting in a complex space requirement for an arrangement. (4) The above-mentioned thermal management components are supplied by different suppliers and assembled at the base, which make the working hours longer and are not conducive to supplier management. (5) A large number of cooling pipelines and air conditioning pipelines need to be used, leading to an increase in costs and a weight of the whole vehicle.

Figure 2:
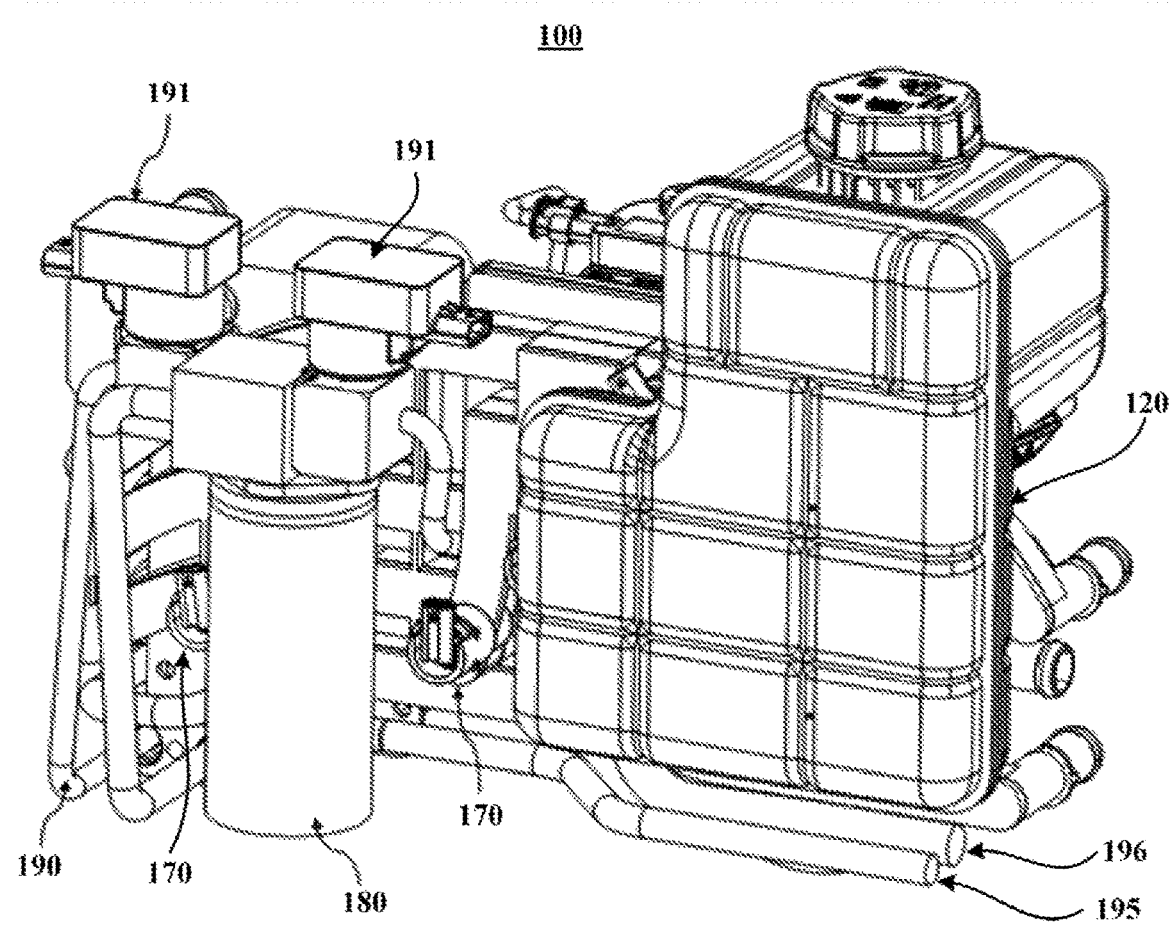
FIG. 2 illustrates a schematic structural view of the thermal management integration module illustrated in FIG. 1, as viewed from another side thereof.
Figure 6:
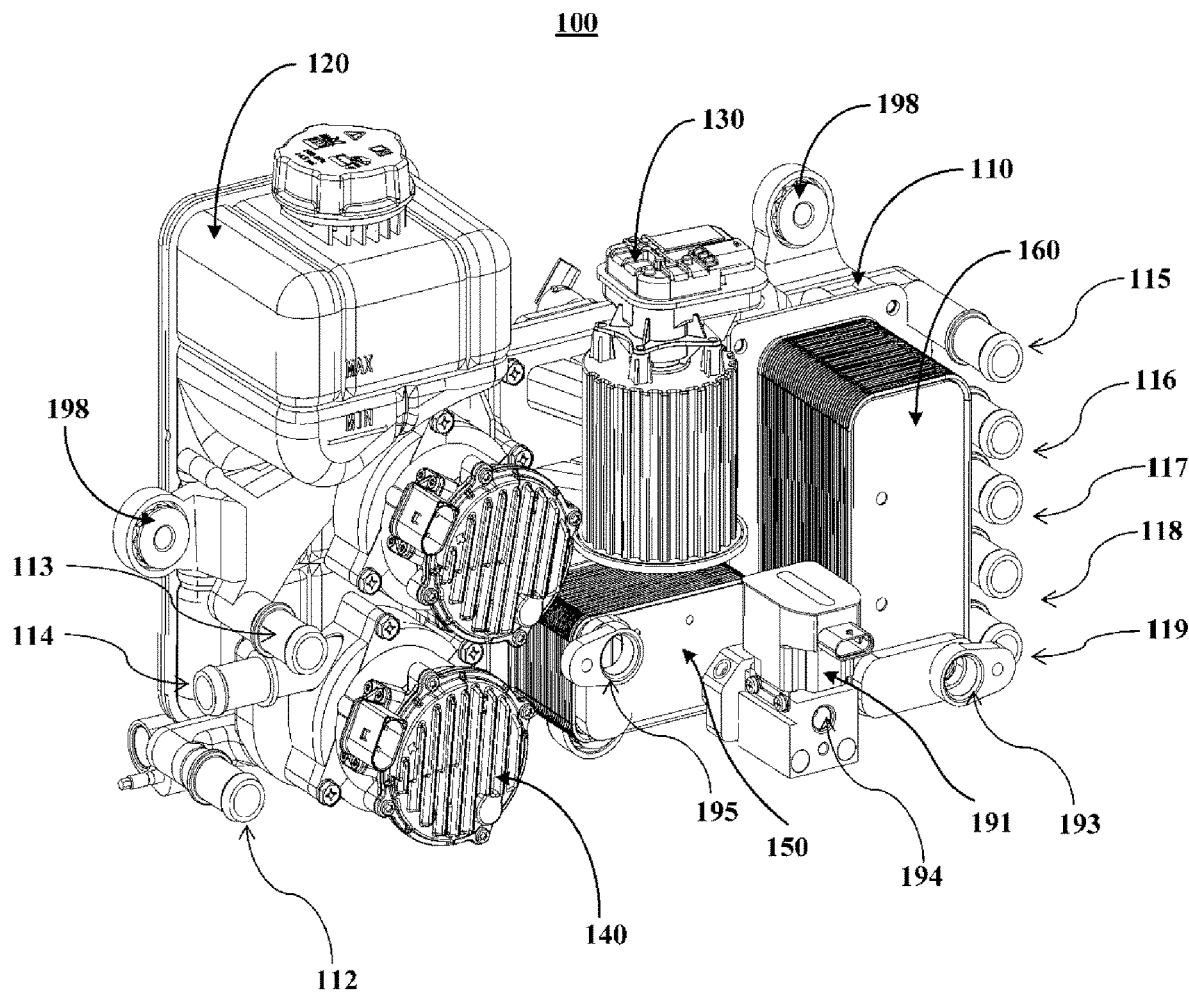
FIG. 6 illustrates a schematic structural view of a thermal management integration module according to another embodiment of the present disclosure, as viewed from a side thereof.
Figure 7:
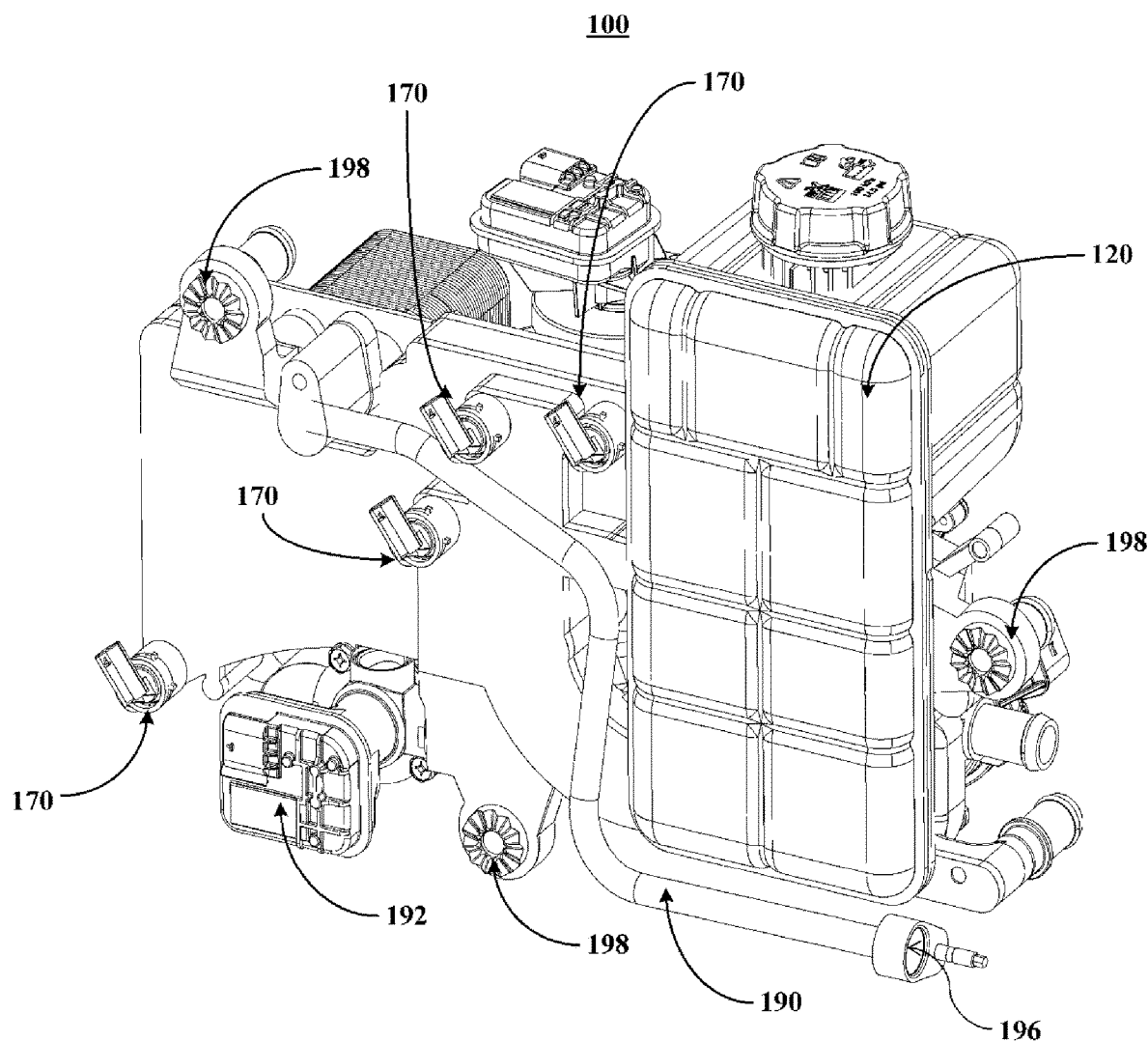
FIG. 7 illustrates a schematic structural view of the thermal management integration module illustrated in FIG. 6, as viewed from another side thereof.

To solve or at least partially solve the above technical problems, the embodiments of the present disclosure provide a thermal management integration module. FIG. 1 illustrates a schematic structural view of a thermal management integration module 100 according to an embodiment of the present disclosure, as viewed from a side thereof. FIG. 2 illustrates a schematic structural view of the thermal management integration module 100 illustrated in FIG. 1, as viewed from another side thereof. FIG. 6 illustrates a schematic structural view of the thermal management integration module 100 according to another embodiment of the present disclosure, as viewed from a side thereof. FIG. 7 illustrates a schematic structural view of the thermal management integration module 100 illustrated in FIG. 6, as viewed from another side thereof. As illustrated in FIG. 1, FIG. 2, FIG. 6, and FIG. 7, the thermal management integration module 100 may generally include a multi-channel integration board 110 and at least two thermal management components. The multi-channel integration board 110 has a plurality of cooling connection pipelines 111 (e.g., water lines) formed therein and configured as connection channels between different thermal management components. In addition, the multi-channel integration board 110 may further act as a carrier member for the entire thermal management integration module 100 to carry the thermal management components. The at least two thermal management components are mounted on the multi-channel integration board 110 and connected to each other by the cooling connection pipelines 111 in the multi-channel integration board 110.

The thermal management integration module 100 according to the embodiments of the present disclosure adopts the design of the multi-channel integration board 110. The plurality of cooling connection pipelines 111 is formed in the multi-channel integration board 110. The multi-channel integration board 110 can not only serve as a connection channel between different thermal management components, but also serve as the carrier member for the entire integration module to enable the thermal management components to be integrated on the multi-channel integration board 110, forming the thermal management integration module 100 with low costs, a light weight, and a small arrangement space. Since the integrated thermal management components are connected to each other by using the cooling connection pipelines 111 in the multi-channel integration board 110 without an additional connection pipeline, the costs are reduced while a cabin is beautified. In addition, the thermal management components are integrated and arranged on the multi-channel integration board 110 to form a one-piece module, and thus the thermal management integration module 100 of the present disclosure can be supplied in a modular form, which greatly optimizes supplier management and working hours of manufacturing workers.

Figure 4:
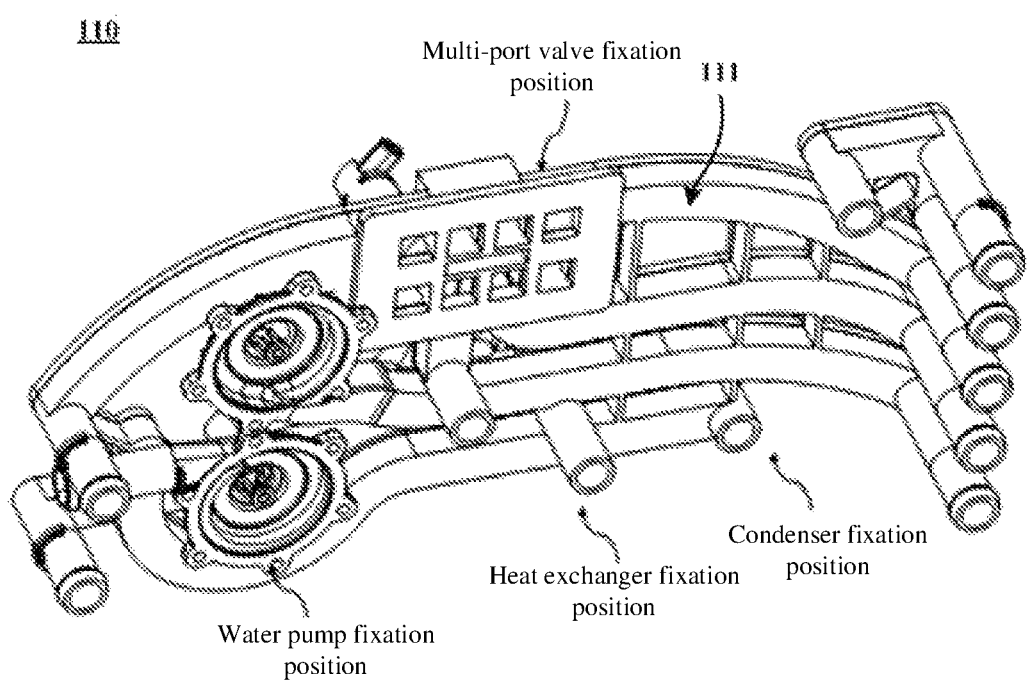
FIG. 4 illustrates a schematic structural view of a multi-channel integration board of a thermal management integration module according to an embodiment of the present disclosure.

The multi-channel integration board 110 is a key component of the thermal management integration module 100 of the present disclosure. The cooling connection pipeline 111 inside the multi-channel integration board 110 is designed based on a connection method for respective thermal management components in a vehicle thermal management principle diagram that is actually applied, to realize a pipeline (e.g., water line) connection between the thermal management components. FIG. 4 illustrates a schematic structural view of a multi-channel integration board 110 of a thermal management integration module 100 according to an embodiment of the present disclosure. As illustrated in FIG. 4, each cooling connection pipeline 111 inside the multi-channel integration board 110 extends substantially along a length direction of the multi-channel integration board 110. In use, the thermal management integration module 100 is mounted in a manner that the length direction of the multi-channel integration board 110 is substantially parallel to a horizontal direction and a width direction of the multi-channel integration board 110 is substantially perpendicular to a vehicle chassis, minimizing a flow resistance of a cooling liquid (e.g., water), flowing through each cooling connection pipeline 111, generated due to gravity.

To ensure thermal insulation between respective cooling connection pipelines 111 and to reduce a heat loss, the multi-channel integration board 110 may be made of a thermally insulating plastic such as Polypropylene (PP) or Polyamide 66 (PA66). By using the multi-channel integration board 110 made of PP or PA66, the strength of the multi-channel integration board 110 can be ensured while ensuring thermal insulation, which can improve structural stability and durability of the thermal management integration module 100. To facilitate molding of the multi-channel integration board 110, a separate molding method may be used. The multi-channel integration board 110 is divided into a main body portion and a cover plate portion in a thickness direction of the multi-channel integration board 110. A cooling connection pipeline 111 having openings is formed on the main body portion. After the main body portion and the cover plate portion are injection molded separately, the main body portion and the cover plate portion are connected and fixed by welding to obtain the multi-channel integration board 110. Welding methods include, but are not limited to, hot plate welding, friction welding, laser welding, etc.

The integrated thermal management components may be selected based on actual requirements of vehicle thermal management. Also, mounting positions of the integrated thermal management components on the multi-channel integration board 110 may be determined based on shapes and sizes of actually-selected thermal management components, a connection method and an operation method of the actually-selected thermal management components in the vehicle thermal management principle diagram, or the like. Accordingly, fixation structures for these thermal management components are designed on corresponding positions of the multi-channel integration board 110.

In general, the thermal management components integrated on the multi-channel integration board 110 may include at least two of an expansion tank 120, a multi-port valve 130, a water pump 140, a heat exchanger 150, a condenser 160 (e.g., a water-cooled condenser), a temperature sensor 170, a dryer 180, an electronic expansion valve 191, a two-port proportional valve 192, an air conditioning pipeline 190, or the like.

A specific structure of the thermal management integration module 100 of the present disclosure is described below in conjunction with embodiments.

Embodiment 1

In an embodiment, the multi-channel integration board 110 has a structure illustrated in FIG. 4.

As illustrated in FIG. 1 and FIG. 2, in the embodiment, the thermal management components integrated on the multi-channel integration board 110 may include at least two of the expansion tank 120, the multi-port valve 130, the water pump 140, the heat exchanger 150, the water-cooled condenser 160, the temperature sensor 170, the dryer 180, the electronic expansion valve 191, the two-port proportional valve 192, or the air conditioning pipeline 190.

When the thermal management components include the water pump 140, in accordance with the vehicle thermal management principle diagram, usually at least two water pumps 140 are provided. One of the two water pumps 140 (which may be referred to as a motor water pump) is configured to drive the cooling liquid in a motor cooling loop of a vehicle to flow, while the other one of the two water pumps 140 (which may be referred to as a battery water pump) is configured to drive the cooling liquid in a battery pack cooling loop of the vehicle to flow. The at least two water pumps 140 may be mounted on a same side of an end of the multi-channel integration board 110 in a length direction and are arranged in a width direction of the multi-channel integration board 110. Such an arrangement of the water pumps facilitates mounting management of the water pumps 140 and allows for more efficient use of a mounting space on the multi-channel integration board 110. In a specific embodiment, a pump housing of the water pump 140 has a cylindrical shape. Accordingly, as illustrated in FIG. 4, a first fixation member having a circular ring shape is disposed at a water pump fixation position on the multi-channel integration board 110. A plurality of first fixation blocks protruding circumferentially and evenly distributed is disposed at an outer periphery of the first fixation member. A first through hole is defined in each first fixation block. A second fixation member corresponding to the first fixation member is disposed at an end of the pump housing of the water pump 140. A second fixation block corresponding to the first fixation block is disposed on an outer periphery of the second fixation member. A second through hole corresponding to the first through hole is defined in each second fixation block. During mounting, a fastener (such as a bolt) passes through the corresponding second through hole and first through hole to fix the water pump 140 to the multi-channel integration board 110.

Further, the thermal management components may further include the expansion tank 120, and the expansion tank 120 is mounted at a position on a side of the multi-channel integration board 110 opposite to the water pump 140. Since the expansion tank 120 has a large volume and is usually connected to one of the water pumps 140, such an arrangement can minimize a length of the cooling connection pipeline 111 (connection channel) between the expansion tank 120 and the water pump 140, to reduce the flow resistance, and allow the mounting space on the multi-channel integration board 110 to be more effectively utilized, thereby saving the arrangement space. A pressure cover is disposed at a top of the expansion tank 120.

The thermal management components may include the multi-port valve 130 (e.g., a four-port solenoid valve, a three-port solenoid valve, etc.). According to the vehicle thermal management principle diagram, ports of the multi-port valve 130 are connected to a plurality of thermal management components in a vehicle thermal management system to control on/off of different thermal management loops. Thus, the multi-port valve 130 may be mounted on a middle portion of a side of the multi-channel integration board 110 to facilitate a connection of the multi-port valve 130 to other thermal management components. In some embodiments, the multi-port valve 130 is a nine-port valve, which can replace one conventional three-port solenoid valve and two conventional four-port solenoid valves in the vehicle thermal management system to achieve nine channels, further reducing the costs and weight of the whole vehicle. In some embodiments, the multi-port valve 130 may be a one-piece nine-port valve having a plate-like mounting panel. Nine channel interfaces (i.e. ports) are intensively disposed on the mounting panel to achieve uniformity of port positions. The one-piece nine-port valve having such a structure can be mounted on the multi-channel integration board 110 easily, which can further reduce the arrangement space occupied by the multi-port valve 130 and greatly improve the arrangement space and aesthetics of distribution of the cooling connection pipelines 111 in communication with these ports.

The thermal management components may further include the heat exchanger 150. The heat exchanger 150 may be mounted on the same side of the multi-channel integration board 110 as the multi-port valve 130 and close to a position of the multi-port valve 130, which can effectively shorten a length of a connection pipeline between the heat exchanger 150 and the port of the multi-port valve 130. In a specific embodiment, the multi-port valve 130 may be mounted on an upper side of the middle portion of the multi-channel integration board 110 (the upper side here refers to an upper side of the thermal management integration module 100 in a vertical direction when the thermal management integration module 100 is in use). The heat exchanger 150 is mounted on a lower side of the middle portion. Specifically, a multi-port valve fixation position and a heat exchanger fixation position are as illustrated in FIG. 4.

The thermal management components may further include the condenser 160 (e.g., the water-cooled condenser 160). Since the condenser 160 in the vehicle thermal management system usually has a large volume, the condenser 160 may be mounted at an end of the multi-channel integration board 110 in a length direction to ensure that the condenser 160 has a sufficient arrangement space. In addition, the condenser 160 may be located on the same side of the multi-channel integration board 110 as the heat exchanger 150, and adjacent to the heat exchanger 150, to improve utilization of the mounting space. Of course, it should be understood by those skilled in the art that, when both the expansion tank 120 and the condenser 160 are integrated on the multi-channel integration board 110, the expansion tank 120 and the condenser 160 are respectively mounted at two ends of the multi-channel integration board 110 in the length direction, to ensure a sufficient arrangement space for each of the expansion tank 120 and the condenser 160.

The thermal management components may further include components in a refrigerant circulation loop of an air conditioning of the vehicle, such as the dryer 180, the electronic expansion valve 191, and the air conditioning pipeline 190. The dryer 180 and the electronic expansion valve 191 are respectively mounted at positions on the side of the multi-channel integration board 110 opposite to the heat exchanger 150. The air conditioning pipeline 190, as a refrigerant flowing pipeline, is connected to the dryer 180, the electronic expansion valve 191, the heat exchanger 150, and the condenser 160, to realize circulation of a refrigerant in a compressor of the air conditioning. A main body portion of the air conditioning pipeline 190 extends on the side of the multi-channel integration board 110 on which the dryer 180 is located. A quantity of electronic expansion valves 191 is set based on an actually-required vehicle thermal management principle diagram. For example, the quantity may be two.

The thermal management components may further include the temperature sensor 170. The temperature sensor 170 is mounted on a designated cooling connection pipeline 111 on the multi-channel integration board 110, and is configured to measure a temperature of a cooling liquid (e.g., water) in the designated cooling connection pipeline 111. A quantity of temperature sensors 170 is set based on an actually-required vehicle thermal management principle diagram. For example, the quantity may be four.

The thermal management components may further include the two-port proportional valve 192 (not illustrated in FIG. 1 or FIG. 2). The two-port proportional valve 192 may be an intelligent proportional valve, which is disposed on the cooling connection pipeline 111 between one of the water pumps 140 and the condenser 160.

The embodiments of the present disclosure are about the specific integrated thermal management components (which may include the expansion tank 120, the multi-port valve 130, the water pump 140, the heat exchanger 150, the condenser 160, the temperature sensor 170, the dryer 180, the electronic expansion valve 191, the air conditioning pipeline 190, etc.). A more compact arrangement of the thermal management components is realized through a reasonable layout of the thermal management components on the multi-channel integration board 110, and a layout of the cooling connection pipelines 111 in the multi-channel integration board 110 is optimized, reducing manufacturing difficulty.

Figure 3:
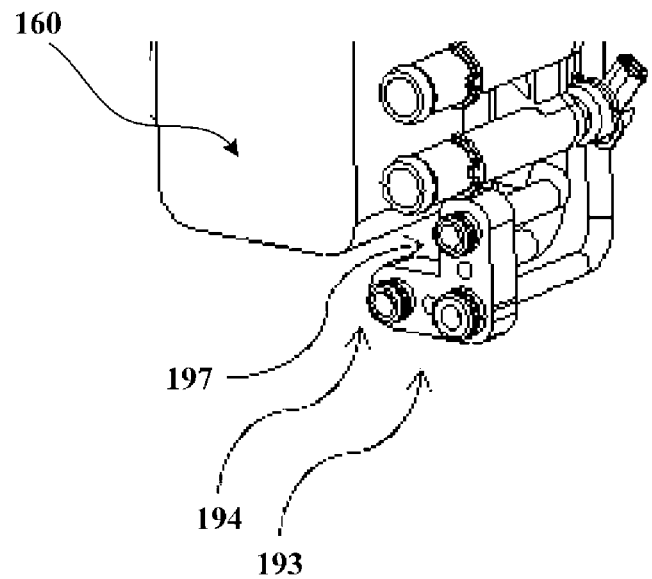
FIG. 3 illustrates a schematic structural view of a lower right corner of the thermal management integration module illustrated in FIG. 1, as viewed from another angle.

Further, as illustrated in FIG. 2 and FIG. 3, the air conditioning pipeline 190 further has an air conditioning pipeline external port configured to be connected to a refrigerant connection pipeline of the thermal management object associated with the air conditioning of the vehicle. In some embodiments, the thermal management object associated with the air conditioning of the vehicle includes a built-in condenser and a compressor of an air conditioning main unit, and the air conditioning pipeline external port includes a built-in condenser inlet port 193, a built-in condenser outlet port 194, a compressor inlet port 195, and a compressor outlet port 196. Each of the built-in condenser inlet port 193 and the built-in condenser outlet port 194 is configured to be connected to a refrigerant connection pipeline of a built-in condenser of an air conditioning main unit of a vehicle. Each of the compressor inlet port 195 and the compressor outlet port 196 is configured to be connected to a refrigerant connection pipeline of a compressor of the vehicle. Positions of the built-in condenser inlet port 193, the built-in condenser outlet port 194, the compressor inlet port 195, and the compressor outlet port 196 are distributed based on arrangement positions of the built-in condenser and the compressor to enable the refrigerant connection pipeline of the built-in condenser and the refrigerant connection pipeline of the compressor to be the shortest. In some embodiments, for example, the compressor inlet port 195 and the compressor outlet port 196 are located on a same side as the expansion tank 120 and located below the expansion tank 120, and the built-in condenser inlet port 193 and the built-in condenser outlet port 194 are located on a same side as the condenser and located below an end of the multi-channel integration board 110 at which the condenser 160 is located.

The air conditioning pipeline external port may further include a built-in evaporator inlet port 197 configured to be connected to a refrigerant connection pipeline of a built-in evaporator of the air conditioning main unit. A position of the built-in evaporator inlet port 197 is distributed based on an arrangement position of the built-in evaporator to enable the refrigerant connection pipeline of the built-in evaporator to be the shortest. In some embodiments, the built-in evaporator inlet port 197 is located on a same side as the condenser 160 and located below an end of the multi-channel integration board 110 at which the condenser 160 is located.

In addition, as illustrated in FIG. 1, the multi-channel integration board 110 further has a plurality of cooling pipeline external ports formed thereon. Each of the plurality of cooling pipeline external ports is configured to be connected to a cooling liquid connection pipeline of a thermal management object of a vehicle. Positions of the plurality of external cooling pipeline external ports are arranged based on an arrangement position of the thermal management object to enable the cooling liquid connection pipeline of the thermal management object to be the shortest. The thermal management object here may include, but is not limited to, a DC-DC converter, a High Voltage Coolant Heater (HVCH), an On-Board Charger (OBC), a battery pack, a radiator, or the like.

Considering the thermal management integration module 100 as a whole, corresponding thermal management objects (such as the DC-DC converter, the HVCH, the OBC, the battery pack, the radiator, the compressor, the built-in condenser and the built-in evaporator of the air conditioning main unit, or the like described above) may be construed as counterparts of the entire thermal management integration module 100. By fully considering arrangement positions of the counterparts, positions of the cooling pipeline external port and the air conditioning pipeline external port are set uniformly to enable a connection pipeline of the thermal management object to be the shortest, further reducing the costs and the weight of the whole vehicle.

In some embodiments, the cooling pipeline external port includes a radiator liquid-inlet port 112, a radiator liquid-outlet port 113, a DC-DC converter liquid-inlet port 114, a high pressure liquid heater liquid-inlet port 115, a high pressure liquid heater liquid-outlet port 118, an on-vehicle charger liquid-outlet port 116, a battery pack liquid-inlet port 119, and a battery pack liquid-outlet port 117. The radiator liquid-inlet port 112, the radiator liquid-outlet port 113, and the DC-DC converter liquid-inlet port 114 are located at an end of the multi-channel integration board 110 in a length direction (in some embodiments, the end at which the water pump 140 is located). The radiator liquid-inlet port 112 and the radiator liquid-outlet port 113 protrude towards a side of the multi-channel integration board 110 (in some embodiments, the side on which the water pump 140 is located). The high pressure liquid heater liquid-inlet port 115, the on-vehicle charger liquid-outlet port 116, the battery pack liquid-outlet port 117, the high pressure liquid heater liquid-outlet port 118, and the battery pack liquid-inlet port 119 are located at the other end of the multi-channel integration board 110 in the length direction (in some embodiments, the end at which the condenser 160 is located), are arranged in a width direction of the multi-channel integration board 110 sequentially, and each have a protrusion direction identical to a protrusion direction of the radiator liquid-inlet port 112. This arrangement can take into account the space utilization, aesthetics, and the convenience of usability of ports.

Figure 5:
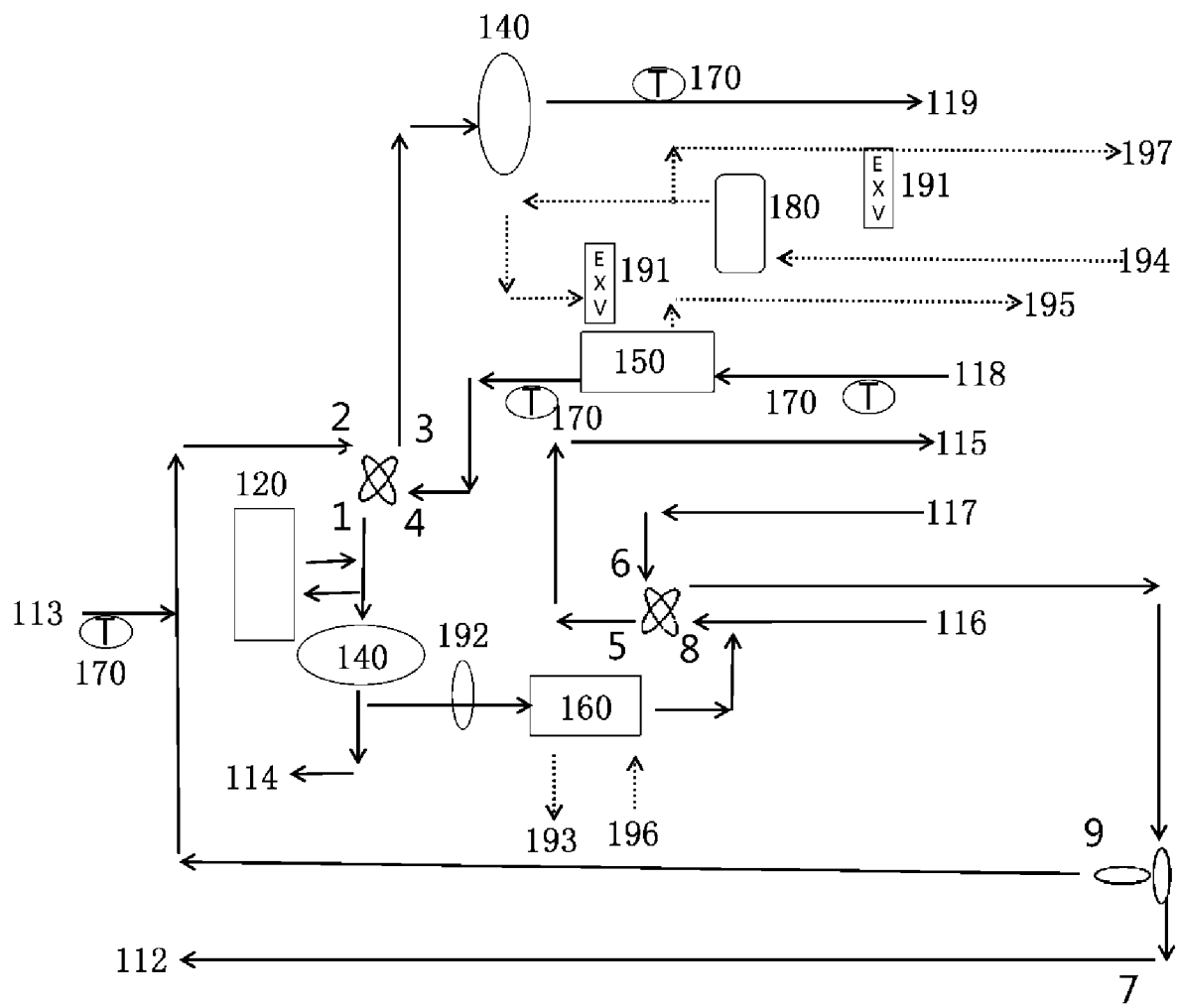
FIG. 5 illustrates a schematic diagram of principles of a thermal management integration module according to an embodiment of the present disclosure.

The components of the thermal management integration module 100 according to the embodiment are described in detail above, and the implementation principle of the thermal management integration module 100 according to the embodiment will be explained below in conjunction with FIG. 5. FIG. 5 illustrates a schematic diagram of a principle of the thermal management integration module 100 according to an embodiment of the present disclosure. In the embodiment, two electronic water pumps 140 (which are referred to as the battery water pump and the motor water pump, respectively), an one-piece nine-port valve, a water-cooled condenser 160, a heat exchanger 150, an expansion tank 120, four temperature sensors 170 (water temperature sensors), an intelligent two-port proportional valve 192, a dryer 180, two electronic expansion valves 191, and an air conditioning pipeline 190 are integrated on the multi-channel integration board 110. In FIG. 5, the one-piece nine-port valve is equivalent to two four-port solenoid valves and one three-port solenoid valve, with number 1 to number 9 indicating nine ports of the one-piece nine-port valve. The solid line indicates the cooling connection pipeline 111 in the multi-channel integration board 110. The arrow on the solid line indicates a flow direction of the cooling liquid in the cooling connection pipeline 111. The dotted line indicates the air conditioning pipeline 190. The arrow on the dotted line indicates a flow direction of the refrigerant in the air conditioning pipeline 190. Through the cooling connection pipeline 111 and the air conditioning pipeline 190 in the multi-channel integration board 110, connections between respective thermal management components illustrated in FIG. 5 are achieved. In addition, the plurality of cooling pipeline external ports and the air conditioning pipeline external ports illustrated in FIG. 5 are provided to form different thermal management loops.

Embodiment 2

Differences between Embodiment 2 and Embodiment 1 mainly lie in the following description.

The thermal management components, associated with the refrigerant circulation loop of the air conditioning of the vehicle, that are integrated on the multi-channel integration board 110 include no dryer 180 and only one electronic expansion valve 191. In this case, as illustrated in FIG. 6 and FIG. 7, the electronic expansion valve 191 is mounted on the same side of the multi-channel integration board 110 as the heat exchanger 150 and close to a position of the heat exchanger 150, and the air conditioning pipeline 190 is connected to the electronic expansion valve 191, the heat exchanger 150, and the condenser 160. The main body portion of the air conditioning pipeline 190 extends on the side of the multi-channel integration board 110 on which the expansion tank 120 is located, and forms the compressor outlet port 196 on the same side as the expansion tank 120 and below the expansion tank 120. The built-in condenser outlet port 194 is formed on a valve seat of the electronic expansion valve 191. The built-in condenser inlet port 193 and the compressor inlet port 195 are formed on the water-cooled condenser 160 and the heat exchanger 150, respectively. Thus, a length of the air conditioning pipeline 190 and lengths of the connection pipelines between the compressor and the built-in condenser and these corresponding ports can be effectively shortened.

Figure 8A:
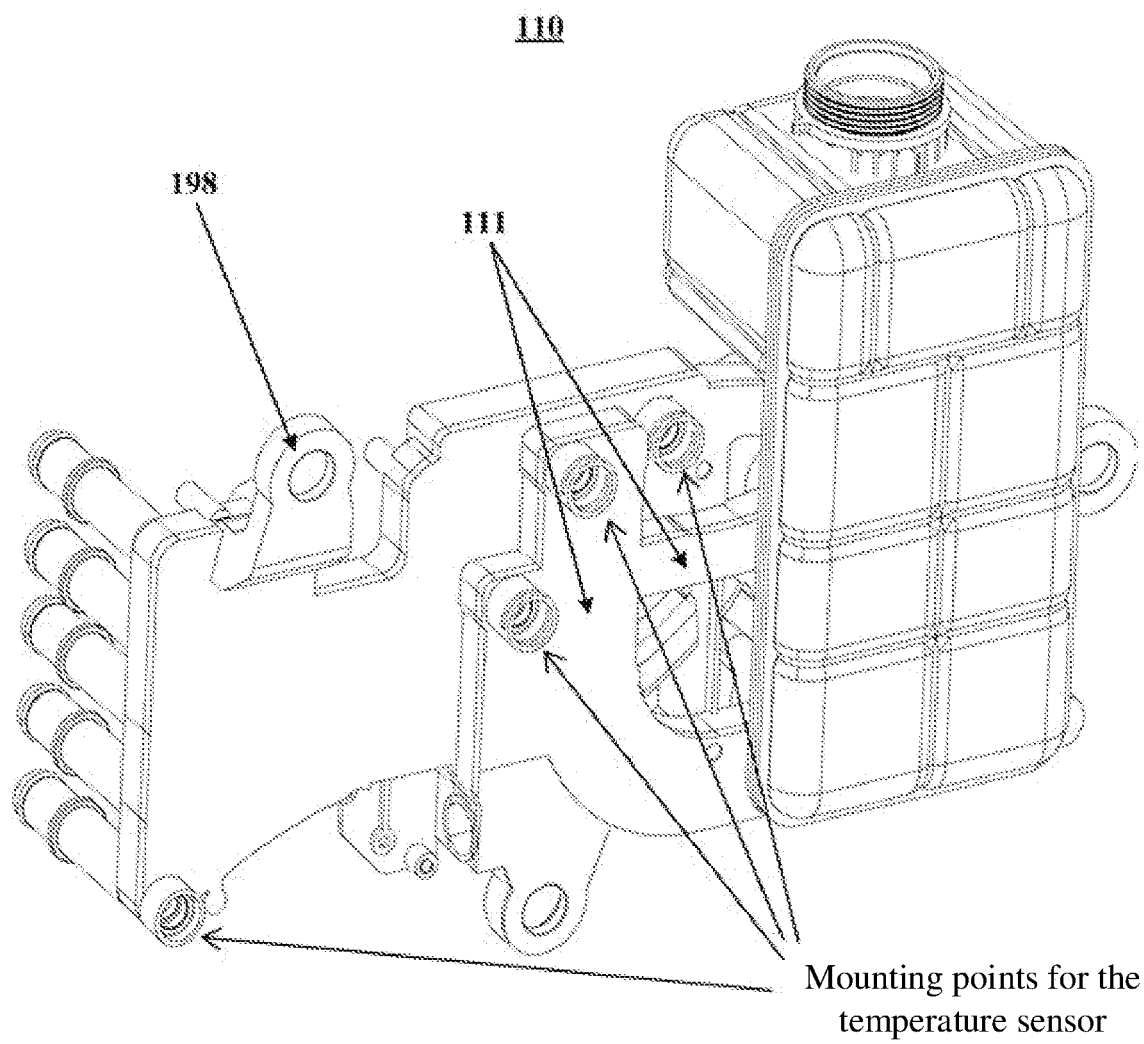
FIG. 8a illustrates a schematic structural view of a multi-channel integration board of a thermal management integration module according to another embodiment of the present disclosure, as viewed from a side of the multi-channel integration board.
Figure 8B:
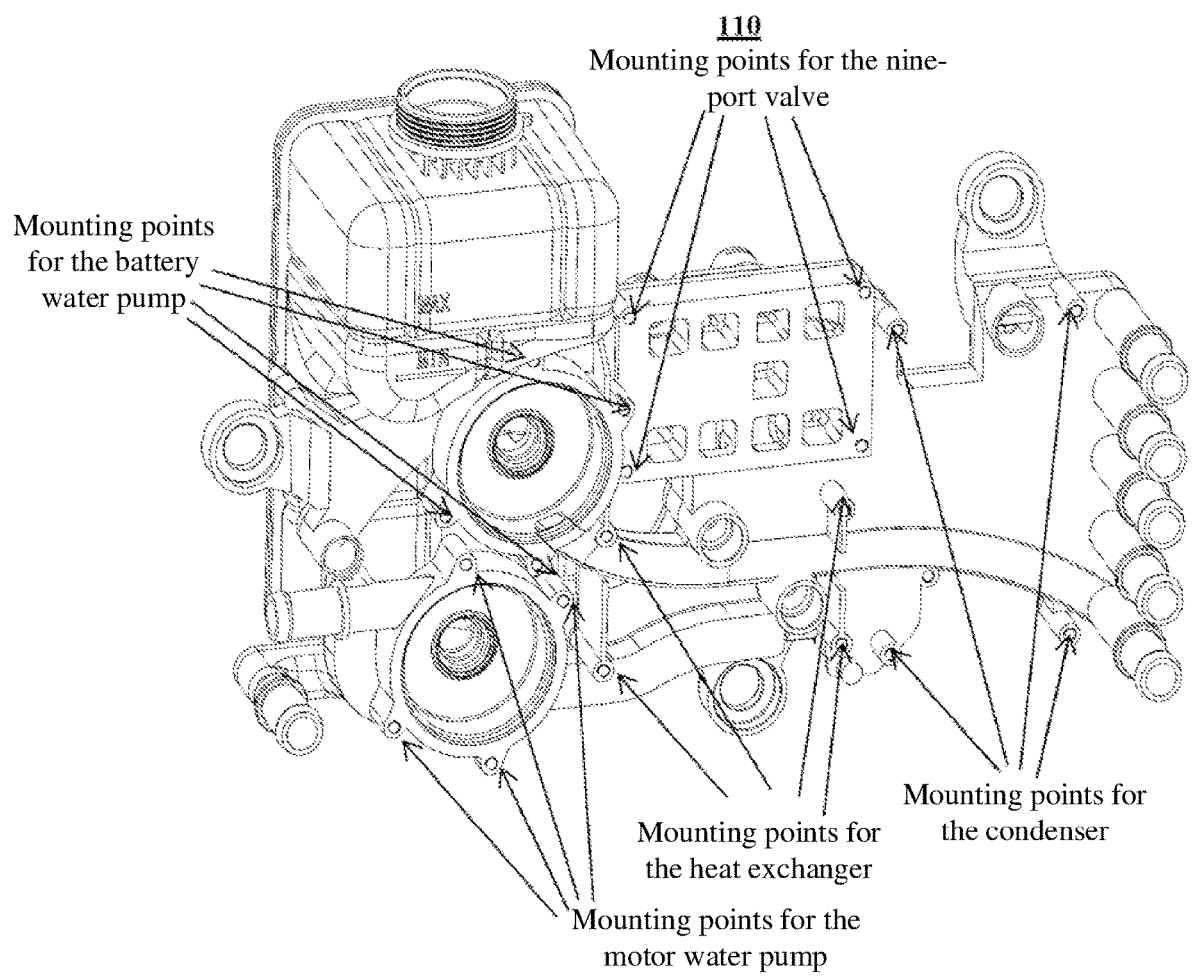
FIG. 8b illustrates a schematic structural view of the multi-channel integration board of FIG. 8a, as viewed from another side thereof.

As illustrated in FIG. 8*a* and FIG. 8*b*, the multi-channel integration board 110 according to the embodiment further has a plurality of mounting lugs 198 disposed thereon and configured for mounting and fixing the thermal management integration module 100 to a body of the vehicle. Each mounting lug 198 protrudes outwards from an edge of the multi-channel integration board 110, and includes a root connected to the edge of the multi-channel integration board 110 and a head facing away from the multi-channel integration board 110. The head has a central through hole defined thereon, and is configured to be engaged with a fastener capable of passing through the central through hole to mount and fix the thermal management integration module 100 to the body of the vehicle. To ensure stable mounting, at least three mounting lugs 198 are provided. In some embodiments, three mounting lugs 198 are provided. The three mounting lugs 198 may be disposed on three edges of the multi-channel integration board 110, respectively. Further, a ring-shaped cushion may be disposed in the central through hole of each mounting lug 198. A thickness of the cushion is greater than a thickness of the head of the mounting lug 198, to enable a surface of the cushion to protrude beyond the central through hole. Subsequent to mounting of the thermal management integration module 100 to the body of the vehicle, the cushion can cushion a collision between the mounting lug 198 and the body of the vehicle to which the thermal management integration module 100 is fixed. The cushion may be made of rubber.

In addition, in the embodiment, the expansion tank 120 is pre-integrated on the multi-channel integration board 110 by means of hot plate welding, etc.

Figure 9:
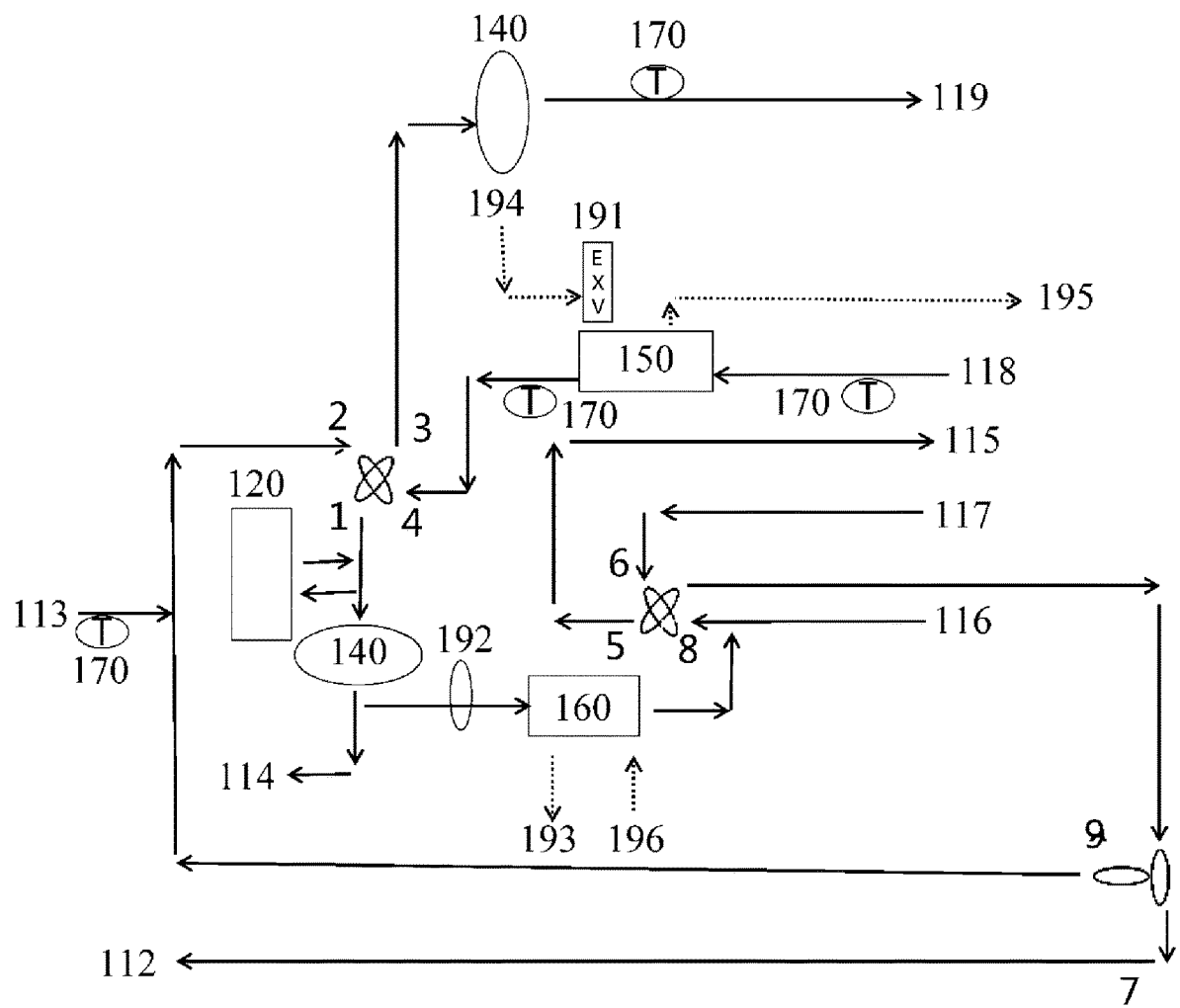
FIG. 9 illustrates a schematic diagram of a principle of a thermal management integration module according to another embodiment of the present disclosure.

The implementation principle of the thermal management integration module 100 according to the embodiment is as illustrated in FIG. 9. In the embodiment, two electronic water pumps 140 (which are referred to as the battery water pump and the motor water pump, respectively), the one-piece nine-port valve, the water-cooled condenser 160, the heat exchanger 150, the expansion tank 120, four temperature sensors 170 (water temperature sensors), the intelligent two-port proportional valve 192, one electronic expansion valve 191, and the air conditioning pipeline 190 are integrated on the multi-channel integration board 110. In FIG. 9, the one-piece nine-port valve is equivalent to two four-port solenoid valves and one three-port solenoid valve, with number 1 to number 9 indicating nine ports of the one-piece nine-port valve. The solid line indicates the cooling connection pipeline 111 in the multi-channel integration board 110. The arrow on the solid line indicates a flow direction of the cooling liquid in the cooling connection pipeline 111. The dotted line indicates the air conditioning pipeline 190. The arrow on the dotted line indicates a flow direction of the refrigerant in the air conditioning pipeline 190. Through the cooling connection pipeline 111 and the air conditioning pipeline 190 in the multi-channel integration board 110, connections between respective thermal management components illustrated in FIG. 9 are achieved. In addition, the plurality of cooling pipeline external ports and the air conditioning pipeline external ports illustrated in FIG. 9 (which, in some embodiments, are the radiator liquid-inlet port 112, the radiator liquid-outlet port 113, the DC-DC converter liquid-inlet port 114, the high pressure liquid heater liquid-inlet port 115, the high pressure liquid heater liquid-outlet port 118, the on-vehicle charger liquid-outlet port 116, the battery pack liquid-inlet port 119, the battery pack liquid-outlet port 117, the built-in condenser inlet port 193, the built-in condenser outlet port 194, the compressor inlet port 195, and the compressor outlet port 196) are provided to form different thermal management loops.

Based on the same technical concept, the embodiments of the present disclosure further provide an electric vehicle including the thermal management integration module 100 according to any or a combination of the above-mentioned embodiments.

Compared with a conventional vehicle thermal management system, the thermal management integration module 100 of the present disclosure can allow the costs of each electric vehicle adopting the thermal management integration module 100 to be reduced by more than 300 RMB and the weight of each electric vehicle to be reduced by more than 2 kg.

At this point, it is conceivable for those skilled in the art that, although exemplary embodiments of the present disclosure have been shown and described in detail herein, many other variations or modifications consistent with the principle of the present disclosure can still be directly determined or deduced from the contents of the present disclosure, without departing from the spirit and scope of the present disclosure. Accordingly, the scope of the present disclosure should be construed and determined to cover all such other variations or modifications.

What is claimed is:

1. A thermal management integration module, comprising:
 a multi-channel integration board having a plurality of cooling connection pipelines formed therein, the multi-channel integration board being configured as a carrier member for the thermal management integration module; and
 at least two thermal management components mounted on the multi-channel integration board and connected to each other by the plurality of cooling connection pipelines,
 wherein the at least two thermal management components comprise at least two of an expansion tank, a multi-port valve, a water pump, a heat exchanger, a condenser, a temperature sensor, a dryer, an electronic expansion valve, a two-port proportional valve, or an air conditioning pipeline, wherein:
 when the at least two thermal management components comprise the water pump, at least two water pumps are provided, and the at least two water pumps are mounted on a same side of an end of the multi-channel integration board in a length direction and are arranged in a width direction of the multi-channel integration board; and
 when the at least two thermal management components further comprise the expansion tank, the expansion tank is mounted at a position on a side of the multi-channel integration board opposite to the water pump.

2. A thermal management integration module, comprising:
 a multi-channel integration board having a plurality of cooling connection pipelines formed therein, the multi-channel integration board being configured as a carrier member for the thermal management integration module; and
 at least two thermal management components mounted on the multi-channel integration board and connected to each other by the plurality of cooling connection pipelines,
 wherein the at least two thermal management components comprise at least two of an expansion tank, a multi-port valve, a water pump, a heat exchanger, a condenser, a temperature sensor, a dryer, an electronic expansion valve, a two-port proportional valve, or an air conditioning pipeline,
 wherein when the at least two thermal management components comprise the multi-port valve, the multi-port valve is mounted on a middle portion of a side of the multi-channel integration board, and the multi-port valve is a nine-port valve, wherein:
 when the at least two thermal management components further comprise the heat exchanger, the heat exchanger is mounted on the same side of the multi-channel integration board as the multi-port valve and close to a position of the multi-port valve; and when the at least two thermal management components further comprise the condenser, the condenser is mounted at an end of the multi-channel integration board in a length direction, located on the same side of the multi-channel integration board as the heat exchanger, and adjacent to the heat exchanger.

3. The thermal management integration module according to claim 2, wherein:

when the at least two thermal management components further comprise the dryer, the electronic expansion valve, and the air conditioning pipeline, the dryer and the electronic expansion valve are respectively mounted at positions on the side of the multi-channel integration board opposite to the heat exchanger, and the air conditioning pipeline is connected to the dryer, the electronic expansion valve, the heat exchanger, and the condenser; or when the at least two thermal management components further comprise the electronic expansion valve and the air conditioning pipeline, the electronic expansion valve is mounted on the same side of the multi-channel integration board as the heat exchanger and close to a position of the heat exchanger, and the air conditioning pipeline is connected to the electronic expansion valve, the heat exchanger, and the condenser.

4. The thermal management integration module according to claim 3, wherein:

the air conditioning pipeline has a built-in condenser inlet port, a built-in condenser outlet port, a compressor inlet port, and a compressor outlet port;

each of the built-in condenser inlet port and the built-in condenser outlet port is configured to be connected to a refrigerant connection pipeline of a built-in condenser of an air conditioning main unit of a vehicle, and each of the compressor inlet port and the compressor outlet port is configured to be connected to a refrigerant connection pipeline of a compressor of the vehicle; and positions of the built-in condenser inlet port, the built-in condenser outlet port, the compressor inlet port, and the compressor outlet port are distributed based on arrangement positions of the built-in condenser and the compressor to enable the refrigerant connection pipeline of the built-in condenser and the refrigerant connection pipeline of the compressor to be the shortest.

5. A thermal management integration module, comprising:

a multi-channel integration board having a plurality of cooling connection pipelines formed therein, the multi-channel integration board being configured as a carrier member for the thermal management integration module; and at least two thermal management components mounted on the multi-channel integration board and connected to each other by the plurality of cooling connection pipelines, wherein the multi-channel integration board further has a plurality of cooling pipeline external ports formed thereon, each of the plurality of cooling pipeline external ports is configured to be connected to a cooling liquid connection pipeline of a thermal management object of a vehicle, and positions of the plurality of external cooling pipeline external ports are arranged based on an arrangement position of the thermal management object to enable the cooling liquid connection pipeline of the thermal management object to be the shortest.

6. The thermal management integration module according to claim 5, wherein:

the cooling pipeline external port comprises a radiator liquid-inlet port, a radiator liquid-outlet port, a Direct Current-Direct Current (DC-DC) converter liquid-inlet port, a high pressure liquid heater liquid-inlet port, a high pressure liquid heater liquid-outlet port, an on-vehicle charger liquid-outlet port, a battery pack liquid-inlet port, and a battery pack liquid-outlet port;

the radiator liquid-inlet port, the radiator liquid-outlet port, and the DC-DC converter liquid-inlet port are located at an end of the multi-channel integration board in a length direction, and the radiator liquid-inlet port and the radiator liquid-outlet port protrude towards a side of the multi-channel integration board; and the high pressure liquid heater liquid-inlet port, the on-vehicle charger liquid-outlet port, the battery pack liquid-outlet port, the high pressure liquid heater liquid-outlet port, and the battery pack liquid-inlet port are located at the other end of the multi-channel integration board in the length direction, are arranged in a width direction of the multi-channel integration board sequentially, and each have a protrusion direction identical to a protrusion direction of the radiator liquid-inlet port.

7. An electric vehicle, comprising the thermal management integration module according to claim 1.

8. The electric vehicle according to claim 7, wherein the multi-channel integration board further has a plurality of cooling pipeline external ports formed thereon, each of the plurality of cooling pipeline external ports is configured to be connected to a cooling liquid connection pipeline of a thermal management object of a vehicle, and positions of the plurality of external cooling pipeline external ports are arranged based on an arrangement position of the thermal management object to enable the cooling liquid connection pipeline of the thermal management object to be the shortest.

9. The electric vehicle according to claim 8, wherein:

the cooling pipeline external port comprises a radiator liquid-inlet port, a radiator liquid-outlet port, a Direct Current-Direct Current (DC-DC) converter liquid-inlet port, a high pressure liquid heater liquid-inlet port, a high pressure liquid heater liquid-outlet port, an on-vehicle charger liquid-outlet port, a battery pack liquid-inlet port, and a battery pack liquid-outlet port;

the radiator liquid-inlet port, the radiator liquid-outlet port, and the DC-DC converter liquid-inlet port are located at an end of the multi-channel integration board in a length direction, and the radiator liquid-inlet port and the radiator liquid-outlet port protrude towards a side of the multi-channel integration board; and the high pressure liquid heater liquid-inlet port, the on-vehicle charger liquid-outlet port, the battery pack liquid-outlet port, the high pressure liquid heater liquid-outlet port, and the battery pack liquid-inlet port are located at the other end of the multi-channel integration board in the length direction, are arranged in a width direction of the multi-channel integration board sequentially, and each have a protrusion direction identical to a protrusion direction of the radiator liquid-inlet port.

10. The thermal management integration module according to claim 1, wherein the multi-channel integration board further has a plurality of cooling pipeline external ports formed thereon, each of the plurality of cooling pipeline external ports is configured to be connected to a cooling liquid connection pipeline of a thermal management object of a vehicle, and positions of the plurality of external cooling pipeline external ports are arranged based on an arrangement position of the thermal management object to enable the cooling liquid connection pipeline of the thermal management object to be the shortest.

11. The thermal management integration module according to claim 10, wherein:
the cooling pipeline external port comprises a radiator liquid-inlet port, a radiator liquid-outlet port, a Direct Current-Direct Current (DC-DC) converter liquid-inlet port, a high pressure liquid heater liquid-inlet port, a high pressure liquid heater liquid-outlet port, an on-vehicle charger liquid-outlet port, a battery pack liquid-inlet port, and a battery pack liquid-outlet port;
the radiator liquid-inlet port, the radiator liquid-outlet port, and the DC-DC converter liquid-inlet port are located at an end of the multi-channel integration board in a length direction, and the radiator liquid-inlet port and the radiator liquid-outlet port protrude towards a side of the multi-channel integration board; and
the high pressure liquid heater liquid-inlet port, the on-vehicle charger liquid-outlet port, the battery pack liquid-outlet port, the high pressure liquid heater liquid-outlet port, and the battery pack liquid-inlet port are located at the other end of the multi-channel integration board in the length direction, are arranged in a width direction of the multi-channel integration board sequentially, and each have a protrusion direction identical to a protrusion direction of the radiator liquid-inlet port.

12. The thermal management integration module according to claim 2, wherein the multi-channel integration board further has a plurality of cooling pipeline external ports formed thereon, each of the plurality of cooling pipeline external ports is configured to be connected to a cooling liquid connection pipeline of a thermal management object of a vehicle, and positions of the plurality of external cooling pipeline external ports are arranged based on an arrangement position of the thermal management object to enable the cooling liquid connection pipeline of the thermal management object to be the shortest.

13. The thermal management integration module according to claim 12, wherein:
the cooling pipeline external port comprises a radiator liquid-inlet port, a radiator liquid-outlet port, a Direct Current-Direct Current (DC-DC) converter liquid-inlet port, a high pressure liquid heater liquid-inlet port, a high pressure liquid heater liquid-outlet port, an on-vehicle charger liquid-outlet port, a battery pack liquid-inlet port, and a battery pack liquid-outlet port;
the radiator liquid-inlet port, the radiator liquid-outlet port, and the DC-DC converter liquid-inlet port are located at an end of the multi-channel integration board in a length direction, and the radiator liquid-inlet port and the radiator liquid-outlet port protrude towards a side of the multi-channel integration board; and
the high pressure liquid heater liquid-inlet port, the on-vehicle charger liquid-outlet port, the battery pack liquid-outlet port, the high pressure liquid heater liquid-outlet port, and the battery pack liquid-inlet port are located at the other end of the multi-channel integration board in the length direction, are arranged in a width direction of the multi-channel integration board sequentially, and each have a protrusion direction identical to a protrusion direction of the radiator liquid-inlet port.

14. The thermal management integration module according to claim 5, wherein the at least two thermal management components comprise at least two of an expansion tank, a multi-port valve, a water pump, a heat exchanger, a condenser, a temperature sensor, a dryer, an electronic expansion valve, a two-port proportional valve, or an air conditioning pipeline.

15. The thermal management integration module according to claim 14, wherein when the at least two thermal management components comprise the multi-port valve, the multi-port valve is mounted on a middle portion of a side of the multi-channel integration board, and the multi-port valve is a nine-port valve.

16. The thermal management integration module according to claim 15, wherein:
when the at least two thermal management components further comprise the heat exchanger, the heat exchanger is mounted on the same side of the multi-channel integration board as the multi-port valve and close to a position of the multi-port valve; and
when the at least two thermal management components further comprise the condenser, the condenser is mounted at an end of the multi-channel integration board in a length direction, located on the same side of the multi-channel integration board as the heat exchanger, and adjacent to the heat exchanger, wherein:
when the at least two thermal management components further comprise the dryer, the electronic expansion valve, and the air conditioning pipeline, the dryer and the electronic expansion valve are respectively mounted at positions on the side of the multi-channel integration board opposite to the heat exchanger, and the air conditioning pipeline is connected to the dryer, the electronic expansion valve, the heat exchanger, and the condenser; or
when the at least two thermal management components further comprise the electronic expansion valve and the air conditioning pipeline, the electronic expansion valve is mounted on the same side of the multi-channel integration board as the heat exchanger and close to a position of the heat exchanger, and the air conditioning pipeline is connected to the electronic expansion valve, the heat exchanger, and the condenser.

17. The thermal management integration module according to claim 16, wherein:
the air conditioning pipeline has a built-in condenser inlet port, a built-in condenser outlet port, a compressor inlet port, and a compressor outlet port;
each of the built-in condenser inlet port and the built-in condenser outlet port is configured to be connected to a refrigerant connection pipeline of a built-in condenser of an air conditioning main unit of a vehicle, and each of the compressor inlet port and the compressor outlet port is configured to be connected to a refrigerant connection pipeline of a compressor of the vehicle; and
positions of the built-in condenser inlet port, the built-in condenser outlet port, the compressor inlet port, and the compressor outlet port are distributed based on arrangement positions of the built-in condenser and the compressor to enable the refrigerant connection pipeline of the built-in condenser and the refrigerant connection pipeline of the compressor to be the shortest.

18. An electric vehicle, comprising the thermal management integration module according to claim 2.

19. The electric vehicle according to claim 18, wherein:
- when the at least two thermal management components further comprise the dryer, the electronic expansion valve, and the air conditioning pipeline, the dryer and the electronic expansion valve are respectively mounted at positions on the side of the multi-channel integration board opposite to the heat exchanger, and the air conditioning pipeline is connected to the dryer, the electronic expansion valve, the heat exchanger, and the condenser; or
- when the at least two thermal management components further comprise the electronic expansion valve and the air conditioning pipeline, the electronic expansion valve is mounted on the same side of the multi-channel integration board as the heat exchanger and close to a position of the heat exchanger, and the air conditioning pipeline is connected to the electronic expansion valve, the heat exchanger, and the condenser.

20. An electric vehicle, comprising the thermal management integration module according to claim 5.

* * * * *